March 16, 1965 R. J. GROSS 3,173,637
REFORMED PARACHUTE RECOVERY APPARATUS
Filed Dec. 17, 1963 4 Sheets-Sheet 3
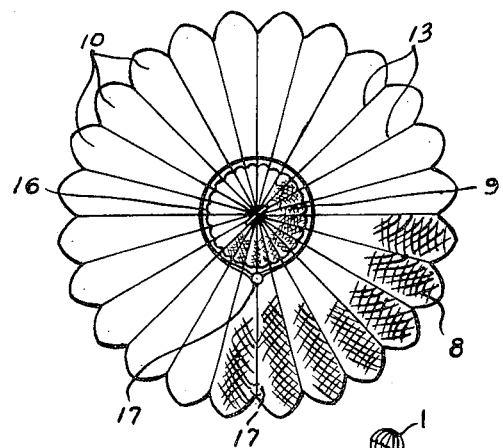
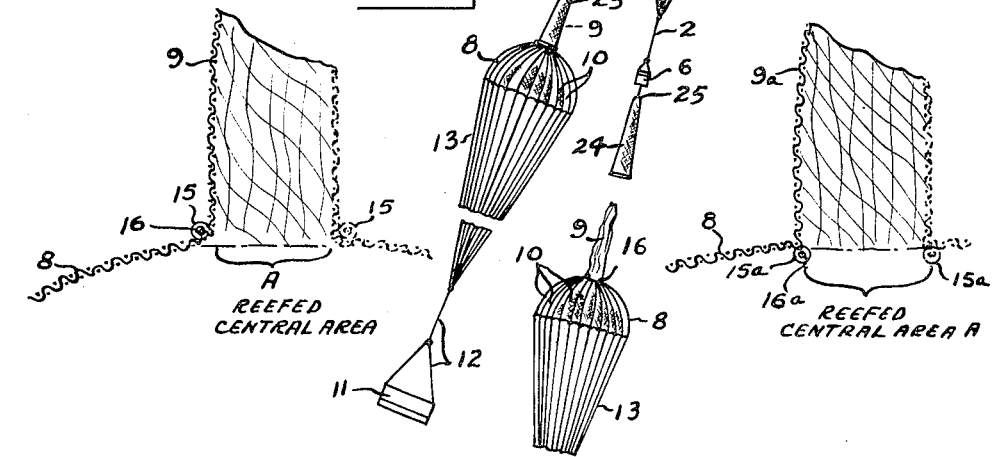
INVENTOR.
REINHOLD J. GROSS
BY
ATTORNEYS

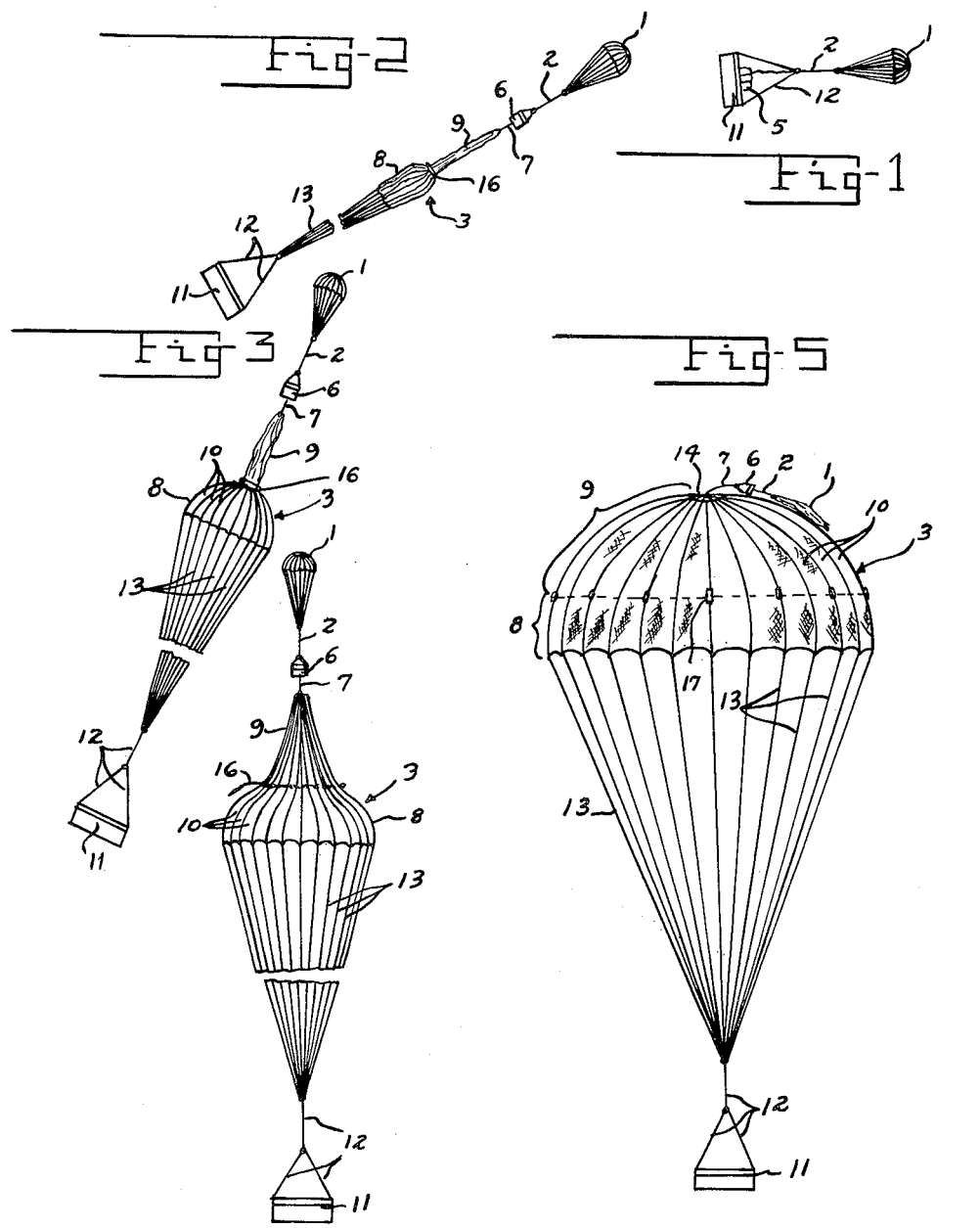

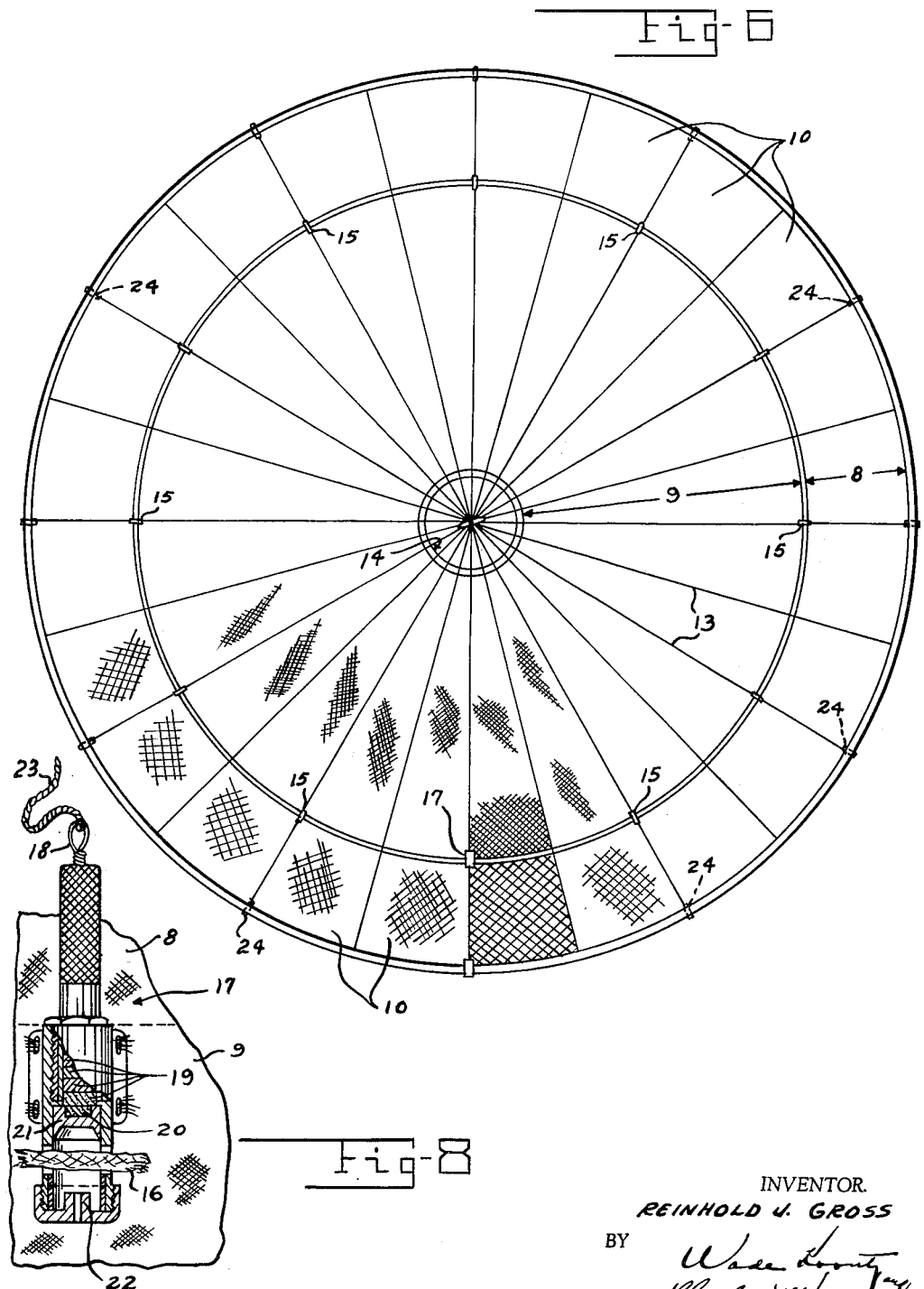

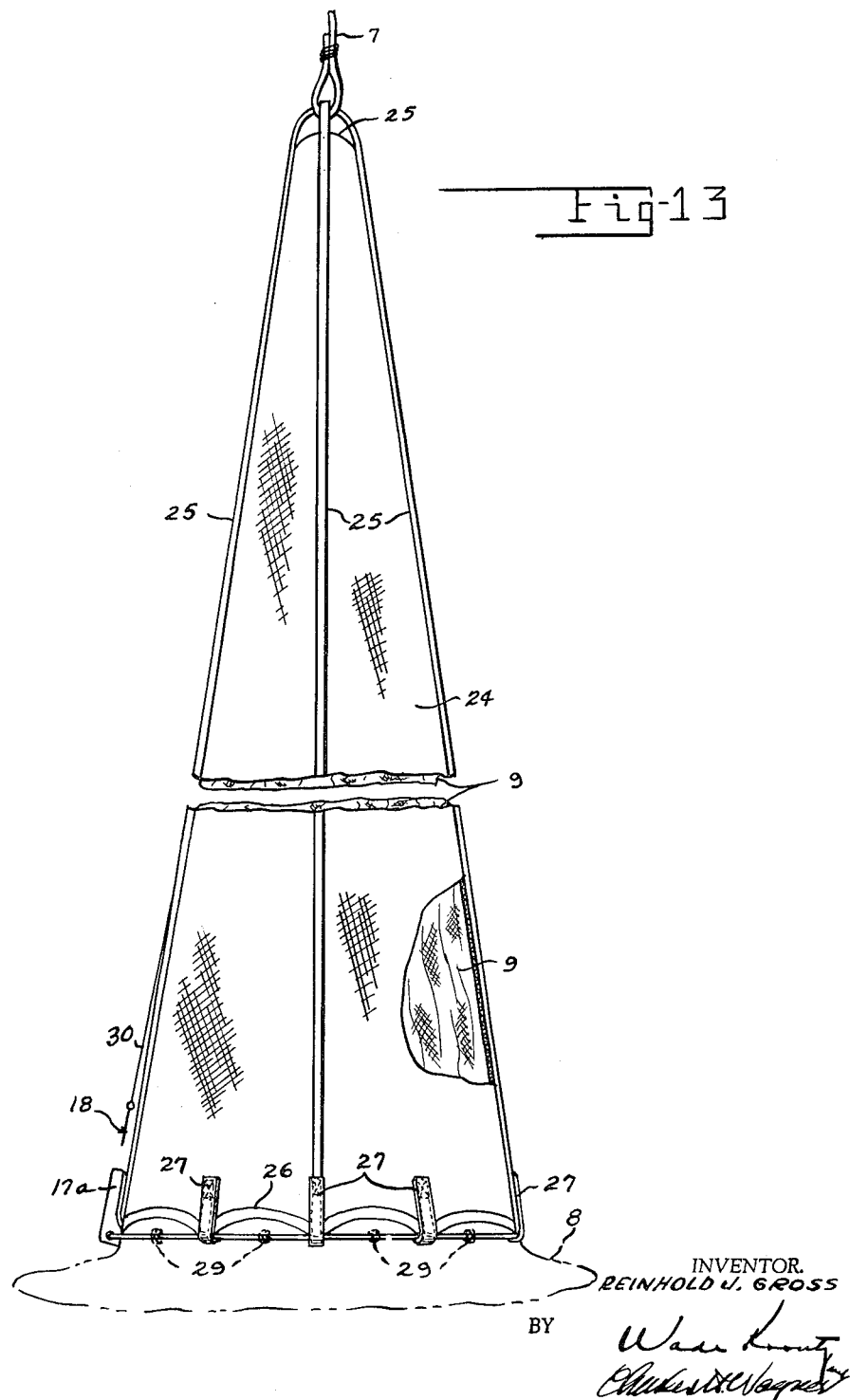

United States Patent Office 3,173,637
Patented Mar. 16, 1965

3,173,637
REFORMED PARACHUTE RECOVERY
APPARATUS
Reinhold J. Gross, Dayton, Ohio, assignor to the United States of America as represented by the Secretary of the Air Force
Filed Dec. 17, 1963, Ser. No. 331,327
9 Claims. (Cl. 244—152)
(Granted under Title 35, U.S. Code (1952), sec. 266)

The invention described herein may be manufactured and used by or for the United States Government for governmental purposes without payment to me of any royalty thereon.

This invention relates to improvements in parachutes and, more particularly, to the provision of parachutes for use with high speed aircraft or in super high altitudes for recovery systems, which provide lower opening shock, having for an object the use of lighter material in the construction and fabrication thereof and consequently the provision of a parachute which is lighter in weight, more economical to manufacture, having smaller volume when packed than conventional parachutes of similar diameters.

A further object of the invention is the provision of a parachute for improving the general efficiency and reliability of parachute recovery systems in the subsonic and supersonic regime.

Another object of the invention is the provision of a parachute canopy which is provided with an annular wide outer ring-like area fabricated from high strength fabric and an inner circular adjoining reefable larger area composed of lighter fabric of less strength, together with reefing line means extending around the canopy between the outer heavier and enclosed inner lighter fabric areas for reefing the inner lighter area, together with time delay reefing line cutting or release means for severing the reefing line following a predetermined deceleration after the parachute has been partly deployed to subject the outer stronger fabric area to the slip stream to effect the preliminary deceleration of the parachute to a predetermined degree.

A still further object of this invention is the provision of a parachute comprising concentric annular outer and inner fabric areas respectively of stronger and lighter less-strength fabrics in which the inner less-strength fabric area is reefed to remove the same from inflation by the slip stream during initial deployment, to cause preliminary deceleration of the chute by the outer relatively stronger fabric area, including time delay controlled reefing means for releasing the inner less-strength fabric area to the slip stream following a predetermined deceleration of the parachute by the outer stronger fabric area.

A further object of the invention is the provision of a parachute having a wide annular ring of relatively strong fabric extending inwardly from the edge of the skirt portion, and an inner concentric circular adjoining fabric area composed of relatively lighter fabric with reefing line means for reefing the inner concentric circular adjoining lighter fabric area, to prevent initial deployment of this area when the chute is released for deployment in the slip stream, and including explosive time delay reefing line cutter means energized by initial deployment of the parachute for subsequently releasing the lighter fabric area for inflation by the slip stream after a predetermined time delay following the inflation of the outer fabric area by the slip stream, whereby the outer fabric area is first subject to the higher initial deceleration forces and the inner area is subsequently released for subjection to lower deceleration forces to complete the deployment and final descent of the chute.

A further object of the invention includes a tapered sheath or sleeve member for enclosing and confining the inner lighter fabric area of the parachute with reefing line means surrounding the lower end of the confining sheath member for releasably connecting the sheath to the parachute in surrounding confining relation to the inner lighter strength material, together with time delay reefing line release means for releasing the sheath member for withdrawal thereof from the confined lighter fabric area to release the same, together with a pilot chute connected to the sheath for withdrawing the sheath from the confined inner lighter fabric material when released by the reefing line, for releasing the confined lighter fabric for deployment thereof by the slip stream.

A still further object of the invention is the provision of a second reefing line around the outer edge of outer annular ring-like area of the greater strength fabric for initially reefing the skirt portion of the parachute, together with time delay reefing line cutter means energized by release of the parachute into the slip stream for releasing the outer annular stronger fabric area following a predetermined time delay and deceleration of the chute.

Yet another object of the invention is the provision of a parachute having an outer annular band of material composed of a stronger parachute fabric enclosing an inner concentric circular area of lighter, less-strength material with reefing line means extending concentrically around the canopy adjacent the annular juncture between the stronger and lighter fabric areas for reefing and confining the lighter fabric area during initial deployment and deceleration of the parachute together with time delay reefing line release means initiated into operation upon initial partial deployment for subsequently releasing said reefing line to free the confined inner lighter fabric area following a predetermined time delay after initial partial deployment, together with a pilot chute connected to the center of the lighter fabric area for extending the confined lighter fabric area axially of the direction of descent following the initial partial deployment, during the time delay, and the release of the inner lighter fabric area by the release of the reefing line by the reefing line release means.

A further object includes the provision of a tapered confining fabric sleeve member for receiving and containing the inner lighter fabric in confined elongated relation with the pilot chute connected to the outer end of the sleeve for extension thereof following initial deployment and during the time delay period, together with means at the inner end of the sleeve connecting the sleeve to the reefing line, whereby release of the reefing line releases the sleeve for withdrawal by the pilot chute from the confined inner lighter fabric for release and full deployment of the inner lighter fabric area.

A further object includes reefing line rings or loops disposed adjacent the inner edge of the outer stronger fabric area and at the bottom or lower edge of the sleeve member for receiving the reefing line therethrough, to releasably connect the sleeve to the outer fabric area, while the inner lighter fabric area is confined within the elongated tapered sleeve member and by the reefing line.

Other objects and advantages of the invention will become apparent from the following description and accompanying drawings in which like reference characters refer to like parts in the several figures.

FIGS. 1, 2, 3 and 4 schematically illustrate a parachute incorporating the invention in the process of deployment.

FIG. 5 shows the same parachute in final descent after being fully decelerated and deployed.

FIG. 6 illustrates a plan view of a parachute canopy, laid out flat, incorporating the invention.

FIG. 7 is also a similar top plan view, somewhat schematically illustrating the parachute canopy shown in FIG. 6 with the inner lighter concentric circular fabric area in reefed condition.

FIG. 8 is a detailed longitudinal sectional view of an explosive time delay reefing line cutter which may be employed to sever the reefing line between the outer stronger or heavier, and the inner lighter fabric areas to effect the final full deployment of the canopy.

FIG. 9 is a somewhat schematic sectional view illustrating the reefing line and its location adjacent the juncture between the outer and inner fabric areas, with the reefing line retaining rings or loops located on the exterior surface of the canopy.

FIG. 10 is a similar view, illustrating the reefing line rings or loops attached to the outer or heavier fabric portion on the inner surface of the canopy.

FIG. 11 is a schematic elevational view of a modified embodiment, employing a tapered sleeve or sheath for confining the inner lighter fabric area prior to its deployment, and retained thereon by the reefing line, with the pilot chute connected to the outer or apex end thereof for withdrawing the sleeve off the confined inner fabric area when the reefing line is released to permit complete deployment of the canopy.

FIG. 12 is a similar view immediately following the release or cutting of the reefing line, to illustrate the sleeve withdrawn to permit the confined lighter fabric area to expand or deploy.

FIG. 13 is an enlarged somewhat schematic side elevation of the tapered sleeve or sheath shown in FIGS. 11 and 12, showing the reefing line retaining means for connecting the inner end of the sheath to the inner edge of the heavier or stronger outer fabric area of the canopy.

In FIG. 1 of the drawings there is shown a parachute after the pilot chute has been released and before the main chute has been withdrawn from the pack, the reference numeral 1 denotes the pilot chute connected by a suitable cable or connector 2 to the main chute 3, still retained in the parachute pack 5 and deployment bag or sack 6, and connected by the cable 7 to the apex of the main chute canopy 3.

The main chute or canopy 3 best seen in FIGS. 2 to 6 comprises an outer wide band of relatively strong or heavier parachute fabric indicated at 8, and an adjoining inner circular concentric area of lighter parachute fabric 9, and having any desired number of conventional gores or segments 10, as best seen in FIG. 6, according to the requirement. While only 24 gores 10 are shown, the number could be considerably greater in the event of larger canopies, for instance, where a one hundred foot diameter canopy was fabricated.

In the drawings, reference numeral 11 indicates the load to be lowered by the parachute which is connected by the supporting cables 12 to the main shroud lines 13 of substantially conventional arrangement, the lines 13 extending across the top of the canopy between the gores 10 and across the apex vent 14. At the intersection over the center of the vent 14 the pilot chute cable 7 is connected to the lines 13.

Located adjacent the annular juncture between the outer stronger fabric material 8 and the circular inner relatively lighter reefable fabric area 9, and preferably on the heavier fabric adjacent its inner edge, are suitable reefing line rings or loops 15 through which a reefing line 16 (FIGS. 9 and 10) is adapted to extend for reefing and confining the inner circular lighter fabric area 9 of the canopy against preliminary inflation.

One or more reefing line release means or reefing line cutters 17 (FIG. 6) are secured adjacent the inner edge of the annular stronger fabric area, constructed somewhat after the manner shown in FIG. 8. These, as shown, being in the form of a time delay explosive actuator, such as shown in my patent, No. 2,742,697, entitled "Cutting Implement," issued April 24, 1956.

The explosive time delay actuator details may be any known type such as shown in FIGS. 5 and 6 of Patent 2,665,163 and known as a T2 actuator. Pulling the pin 18, which is connected to a foreshortened line 23 to the pilot chute, releases a firing pin which starts the burning through a series of slow burning pellets 19 which, after a predetermined time period, depending upon the burning time of the pellets 19, ignites an explosive charge 20, driving the cutter 21 outwardly against the anvil 22, thus severing and releasing the reefing line 16 and allowing the inner reefed area 9 to fill and cause a full deployment of the canopy as shown in FIG. 4 where the reefed area 9 is filling and expanding, and in FIG. 5 where the canopy is fully deployed.

It is understood that this time delay actuating pin 18 may be pulled by a foreshortened line 23 which is attached to one of the shroud lines 13 extending over the portion 9 so that when the pilot chute pulls out or extends the confined portion 9 as seen in FIG. 2, the pin 18 is pulled, starting the explosive timer, or the timer 17 may be inverted from the position shown in FIG. 8 and the foreshortened firing line 23 connected to one of the shroud lines 13 below the canopy so that the reefing cutter timing cycle is not initiated until the shroud lines between the canopy and the load 11 are straightened out, as shown in FIG. 2.

In FIG. 9 the reefing line rings or loops 15 are shown exteriorly or on the outer or top side of the canopy; however, as seen in FIG. 10, the reefing rings or loops 15a and the reefing line 16a and explosive time delay reefing line release device 17 may be disposed on the inner side of the canopy 9a. The latter arrangement might reduce the tendency of friction burns during the deployment of the confined or reefed lighter fabric area 9.

If desired, a second series of reefing line rings 24 may be secured around the inside of the bottom edge of the canopy in conventional manner with a time delay reefing line cutter, such as 17, through which the reefing line passes, having a foreshortened firing line connected to one of the shroud lines 13.

In the operation, the chute is first reefed and then packed in, preferably with the reefed portion 9 in a deployment bag 6 is a conventional manner, the chute being carefully packed in the pack 5 with the ripcord connected to the releasing vehicle (not shown) so that when the pack 5 is released, the pilot chute is deployed into the slip stream.

The deployment of the pilot chute 1, allows the lighter reefed area fabric to be withdrawn from the deployment bag 6 while the shroud lines 13 to which the load 11 is attached are withdrawn.

The annular stronger fabric area 8 fills and initiates the deceleration of the chute, and the extension of the confined lighter fabric area 9, or the extension of the shroud lines 13, depending upon which is desired, pulls the firing cord 23 to withdraw the firing pin 18 and start the predetermined explosive time delay cycle, during which predetermined time delay cycle the outer heavier or stronger fabric area 8 only of the canopy is being subjected to a predetermined amount of deceleration, while the lighter fabric area is not subjected to the deceleration pressures, especially during a supersonic or high subsonic release speed.

At the end of the timing period, the reefing line cutter 17 severs the reefing line 16, allowing the slip stream to enter and expand the lighter weight control fabric area (as seen in FIGS. 4 and 5), at which time it is assumed that the chute has been decelerated sufficiently that the deceleration pressures will not rupture the inner lighter (less strong) fabric area 9.

With reference to FIG. 6, it should be noted that the lighter weight fabric area 9 will materially reduce the total weight of the parachute and correspondingly reduce the size of the packed chute over a conventional chute of similar diameter in which all of the fabric must be sufficiently strong (and heavy) to stand the entire deceleration forces.

Referring now to FIGS. 11, 12 and 13, a tapered sleeve or sheath 24 is employed as means for confining the reefed area 9 therein. The pilot chute 1 instead of being connected (through a deployment bag 6) by cables 2 and 7 to the apex of the main canopy 3, as seen in FIGS. 3, 4 and 5, is connected to the apex or upper end 25 of the tapered deployment sleeve 24 for the purpose of pulling the sleeve 24 off of the reefed central fabric area 9 to permit expansion thereof.

Referring now more particularly to FIG. 13, the sleeve 24 may be fabricated from light strong fabric, suitably reinforced by tapes 25 and around its lower end or edge at 26 and provided with suitable reefing line receiving rings or loops 27 for receiving the reefing line 28 which passes through the rings 29 which are secured to the inner annular edge portion of the heavier or stronger fabric band area 8 for the purpose of initially reefing the lighter fabric area 9 against preliminary inflation.

This reefing line 28 in addition to constraining the area 9 against inflation also constitutes a connection between the main canopy 3 and the pilot chute 1, thus eliminating the application of deceleration forces on the lighter reefed canopy area 9.

In this embodiment, the explosive time delay reefing line cutter 17a, similar to the time delay reefing line release means 17 may be secured adjacent the bottom edge of the sheath 24 as shown with the reefing line and connecting means passing therethrough.

In this illustration, the sleeve 24 is shown fully extended (by the pilot chute and its connecting cable 7) with the foreshortened firing cable 30 secured to one of the tapes 25 with the firing pin 18 (of FIG. 8) pulled to initiate the timing cycle.

In the operation after the chute has been partly deployed as seen in FIG. 11, and the timing cycle has elapsed the reefing line 28 is cut, thus releasing the sleeve 24 as well as the confined lighter fabric area 9. The drag of the pilot chute 1 immediately pulls the sheath 24 off of the lighter fabric area 9, thus disconnecting the pilot chute 1 and the sheath 24 from the main canopy 3, allowing the slip stream to fill and completely deploy the canopy (after the time delay and corresponding deceleration) to the substantially hemispherical shape as shown (schematically) in FIG. 5. The sleeve 24 will, of course, be shaped to suitably receive the confined lighter fabric area 9 to permit it to slip off when the reefing line 28 is severed.

For purposes of exemplification, a particular embodiment of the invention has been shown and described to the best understanding thereof. However, it will be apparent that minor changes and modifications in the arrangement and construction of the parts thereof may be resorted to without departing from the true spirit and scope of the invention as defined in the following claims.

I claim:

1. A parachute assembly having a hemispherical canopy comprising, an annular outer skirt portion comprising, a strong fabric area, an inner concentric circular adjoining reefable lighter fabric area, reefing means for reefing the inner lighter fabric area for confining the same during initial release and predetermined deceleration of the parachute, time delay release means for said reefing means operable for releasing the reefing means following a predetermined time delay, and means connected for initiating the actuation of said time delay reefing line release means by release and initial partial deployment of the canopy into the slip stream.

2. In a reefable parachute assembly, a canopy comprising an outer wide annular band of strong parachute fabric capable of withstanding a predetermined opening shock and deceleration forces, an inner adjoining concentric reefable circular lighter fabric area incapable of withstanding the same opening shock and deceleration of the aforesaid outer stronger annular band of strong parachute fabric, a reefing line for reefing said lighter fabric area to prevent deployment thereof during initial deployment and deceleration of said parachute, time delay reefing line cutter means carried adjacent the inner edge portion of said annular outer fabric area for releasing the inner fabric area from its confined reefed condition, actuating means connected to said time delay reefing line cutter means for actuation thereof by release of the parachute assembly into the slip stream and initial partial deployment thereof, for initiating the time delay reefing line cutter means into operation for subsequent release of said reefing line and full deployment of the canopy after the predetermined time delay and corresponding predetermined deceleration of the parachute.

3. A parachute assembly comprising a canopy having an inner circular concentric reefable parachute fabric area and an adjoining concentric outer annular stronger fabric skirt portion, reefing means surrounding said skirt portion adjacent the juncture between said inner reefable parachute fabric area and said outer stronger fabric skirt portion for reefing and confining said inner fabric area during preliminary deployment, predetermined time delay release means carried by said canopy for releasing said reefing means at the end of a predetermined time period for deployment of the inner reefed parachute fabric to cause full deployment of the canopy, and means connected to the canopy assembly and said release means for initiating the time delay release means into operation incident to said preliminary deployment for subsequent release of said inner reefed area.

4. A parachute assembly comprising a parachute pack, a hemispherical canopy contained therein comprising an outer annular stronger skirt portion composed of parachute fabric capable of withstanding a predetermined opening shock and deceleration forces, and an inner adjoining reefable lighter concentric fabric area incapable of withstanding the same opening shock and deceleration forces of the outer annular skirt portion, a pilot chute connected to the center of the inner reefable area for withdrawing and extending the inner reefable area substantially parallel to the direction of descent for assisting in deployment of the canopy from the pack and deceleration thereof when released, a reefing line surrounding the inner lighter fabric area adjacent the annular juncture thereof with the outer stronger fabric area for confining the reefable inner fabric area to prevent preliminary deployment thereof, explosive time delay reefing line cutter means carried by the canopy adjacent said juncture for severing said reefing line after a predetermined time delay to permit full deployment of said inner lighter fabric area following a predetermined time delay and corresponding predetermined deceleration by said outer skirt portion and said pilot chute, and operating means connected between the parachute assembly and said explosive time delay reefing line cutter means for initiating the same into operation incident to preliminary deployment of the canopy and axial extension of the reefed fabric area by said pilot chute.

5. A parachute assembly as set forth in claim 4 including a second reefing line surrounding the bottom edge portion of the skirt of the canopy for reefing the outer skirt portion of the canopy, and a second time delay reefing line cutter for severing the second reefing line following deployment of the canopy from the pack and predetermined deceleration thereof, and means connected to the assembly for initiating the second time delay reefing line cutter into operation incident to initial partial deployment for subsequent severance of said second reefing line after a predetermined time delay and deceleration following deployment of the canopy from the pack.

6. A parachute assembly comprising, a hemispherical canopy having an outer annular stronger parachute fabric skirt portion, and an adjoining inner circular concentric lighter reefable fabric area, reefing line means between the stronger skirt portion and the inner lighter fabric area for reefing the juncture between the lighter fabric area and the surrounding stronger skirt portion to prevent inflation of the inner lighter reefed fabric area by the slip stream, a removable sleeve member receiving and confining the lighter fabric area having an inner receiving end disposed adjacent the juncture between the outer stronger skirt portion and the inner lighter fabric area, releasable connecting means between the reefing line means and the inner end of said removable sleeve member for connecting the sleeve member to the canopy with the lighter fabric area confined therein, a time delay reefing line cutter means secured to said canopy adjacent the juncture between the stronger and lighter fabric areas for severing the reefing line means after a predetermined time delay for releasing the reefed and confined lighter fabric area, and releasing said sleeve member for withdrawal from said confined lighter fabric area, a pilot chute connected to the opposite end of said sleeve member for decelerating said parachute, and withdrawing said sleeve member from said confined lighter fabric area to permit deployment of said lighter fabric area at the termination of the predetermined time delay, and means connected between the canopy assembly and said time delay reefing line cutter means for initiating the operation of said cutter by preliminary deployment of said canopy into the slip stream.

7. In a parachute assembly comprising a pack, a parachute canopy packed therein comprising an outer stronger annular wide fabric band area comprising an annular skirt portion and an enclosed adjoining concentric lighter reefable fabric area comprising a major portion of the total area of the canopy, shroud lines carried by the canopy for suspending a dependent load therefrom, reefing means between the stronger and lighter fabric areas including a reefing line means constricting the juncture between the stronger and lighter fabric areas to confine and prevent deployment of the confined lighter fabric areas when the parachute is initially deployed from the pack into the slip stream, a pilot chute connected to the apex of the canopy for extending the confined lighter fabric area axially when the canopy is preliminarily deployed from the pack into the slip stream, whereby the pilot chute and the outer stronger annular fabric band skirt portion is preliminarily subject to deceleration forces of the slip stream to decelerate the rate of descent of the canopy, time delay reefing line cutter means carried by the canopy for severing the reefing line means after a predetermined time delay following the initiation of the operation of said time delay reefing line cutter means, and foreshortened actuating means connected between said time delay reefing line cutter means and said shroud lines for initiating the operation of said time delay cutter means by partial deployment of the canopy and extension of said shroud lines and said reefed lighter fabric area during preliminary deployment of the canopy from the pack into the slip stream, whereby the annular stronger skirt portion is first exposed to the deceleration forces of the slip stream to effect predetermined deceleration of the canopy during said time delay, whereupon the inner lighter reefed fabric area is deployed to fully deploy the canopy for final descent of the parachute and the load.

8. A parachute assembly comprising a hemispherical canopy having an outer skirt portion comprising an annular band of material width composed of a strong parachute fabric capable of withstanding predetermined deceleration forces, and an adjoining circular inner central fabric area of lighter fabric capable of withstanding lighter deceleration forces when deployed in the slip stream, shroud lines depending from the lower edge of the skirt portion for suspension of a load below the canopy, a light tapered elongated sleeve receiving and confining the lighter fabric area in axially extended compact condition, having a pilot chute connected to the apex, upper end of the tapered sleeve for withdrawing the sleeve from the inner confined lighter area to permit deployment of the inner lighter fabric area, releasable connecting means between the lower end of said sleeve and the canopy, releasably connecting the sleeve to the canopy adjacent the inner edge of the annular outer band of stronger fabric material during preliminary deployment and initial predetermined deceleration of the canopy, time delay operated release means carried by the canopy for releasing the said connecting means to release said sleeve for withdrawal from said confined lighter compacted fabric area to permit full deployment of the canopy by the slip srteam after a predetermined time delay and corresponding predetermined deceleration of the partially deployed canopy in the slip stream, and means for initiating the operation of said time delay operated release means during preliminary partial deployment of the canopy in the slip stream.

9. A parachute assembly as set forth in claim 8 in which the connecting and releasing means between the sleeve and the canopy comprises a reefing line surrounding and confining the periphery of the inner circular central fabric area to prevent inflation thereof by the slip stream, with said reefing line alternately releasably connected around the confined inner fabric area to the lower end of the tapered sleeve and to the canopy, and said release means comprises an explosive time delay reefing line cutter for severing the reefing line to free the sleeve from the canopy for withdrawal of the sleeve from the confined inner central fabric area by the pilot chute to permit the slip stream to enter and deploy the confined inner lighter fabric area, and includes means for initiating the actuation of the reefing line cutter during release and deployment of said annular skirt portion into the slip stream.

References Cited by the Examiner
FOREIGN PATENTS 137,429 1/20 Great Britain.
858,140 6/40 France.

FERGUS S. MIDDLETON, *Primary Examiner.*